US010795510B2

(12) United States Patent
Klein et al.

(10) Patent No.: US 10,795,510 B2
(45) Date of Patent: Oct. 6, 2020

(54) DETECTING INPUT BASED ON A CAPACITIVE PATTERN

(71) Applicant: Microsoft Technology Licensing, LLC, Redmond, WA (US)

(72) Inventors: Christian Klein, Duvall, WA (US); Rob Disano, Seattle, WA (US); Ken M. Sadahiro, Redmond, WA (US); Gregg Wygonik, Duvall, WA (US); Roy Berger, Seattle, WA (US); Robert D. Steen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/418,133

(22) Filed: Jan. 27, 2017

(65) Prior Publication Data

US 2018/0113527 A1   Apr. 26, 2018

Related U.S. Application Data

(60) Provisional application No. 62/412,613, filed on Oct. 25, 2016.

(51) Int. Cl.
  *G06F 3/041*   (2006.01)
  *G06F 3/044*   (2006.01)
  *G06F 3/0354*  (2013.01)

(52) U.S. Cl.
  CPC ............ *G06F 3/044* (2013.01); *G06F 3/0354* (2013.01); *G06F 3/03543* (2013.01)

(58) Field of Classification Search
  None
  See application file for complete search history.

(56) References Cited

U.S. PATENT DOCUMENTS

| 6,903,662 | B2 | 6/2005 | Rix et al. |
| 8,098,240 | B2 | 1/2012 | Zielinski et al. |
| 8,803,814 | B2 | 8/2014 | Andolina |
| 2006/0256090 | A1 | 11/2006 | Huppi |
| 2007/0062852 | A1 | 3/2007 | Zachut et al. |

(Continued)

FOREIGN PATENT DOCUMENTS

WO    2016124584 A2    8/2016

OTHER PUBLICATIONS

"Non-Final Office Action Issued in U.S. Appl. No. 15/426,108", dated Jun. 14, 2013, 16 Pages.

(Continued)

*Primary Examiner* — Carl Adams
(74) *Attorney, Agent, or Firm* — International IP Law Group, PLLC

(57) ABSTRACT

In one example, a method for detecting input can include detecting a capacitive pattern from a physical object and detecting that the physical object is a passive physical object. The method can also include determining a plurality of characteristics corresponding to the passive physical object based on the capacitive pattern, wherein the plurality of characteristics comprise a type of the physical object and a capability of the physical object. Additionally, the method can include modifying an application manager to detect input from the passive physical object based on the plurality of characteristics and modifying a user interface setting detected from the capacitive pattern.

22 Claims, 5 Drawing Sheets

(56) References Cited

U.S. PATENT DOCUMENTS

| | | |
|---|---|---|
| 2009/0114457 A1 | 5/2009 | Lii |
| 2011/0057670 A1 | 3/2011 | Jordan |
| 2012/0062490 A1 | 3/2012 | Heatherly et al. |
| 2012/0182225 A1 | 7/2012 | Brosnan |
| 2012/0194457 A1 | 8/2012 | Cannon et al. |
| 2012/0212422 A1 | 8/2012 | Fang |
| 2012/0249430 A1 | 10/2012 | Oster et al. |
| 2013/0002574 A1 | 1/2013 | Kirn et al. |
| 2013/0012313 A1 | 1/2013 | Chen |
| 2013/0044078 A1* | 2/2013 | Hallenberg ............. G06F 3/039 345/174 |
| 2013/0106766 A1* | 5/2013 | Yilmaz ................. G06F 3/0383 345/174 |
| 2013/0194192 A1 | 8/2013 | Andolina |
| 2013/0302777 A1 | 11/2013 | Tomkins et al. |
| 2013/0314375 A1 | 11/2013 | Rickstrom et al. |
| 2014/0101576 A1* | 4/2014 | Kwak ................... G06F 1/1643 715/761 |
| 2014/0327628 A1 | 11/2014 | Tijssen et al. |
| 2014/0354565 A1 | 12/2014 | Yoon |
| 2015/0094621 A1 | 4/2015 | Alberts et al. |
| 2015/0199941 A1 | 7/2015 | Reunamaki et al. |
| 2015/0220169 A1* | 8/2015 | Keating .............. G06F 3/03545 345/179 |
| 2015/0242018 A1 | 8/2015 | Shi |
| 2015/0261378 A1* | 9/2015 | Lee ..................... G06F 3/04842 715/765 |
| 2016/0040974 A1 | 2/2016 | Zachut et al. |
| 2016/0151714 A1 | 6/2016 | Shi |
| 2016/0209957 A1* | 7/2016 | Jung .................... G06F 3/0484 |
| 2016/0283035 A1 | 9/2016 | Sandblad et al. |
| 2017/0038907 A1* | 2/2017 | Buckett ................. G06F 3/0416 |

OTHER PUBLICATIONS

"International Search Report and Written Opinion issued in PCT Application No. PCT/US2018/016054", dated Apr. 12, 2018, 16 Pages.

"Final Office Action Issued in U.S. Appl. No. 15/426,108", dated Nov. 14, 2018, 19 Pages.

Rekomoto, Jun, "SmartSkin: An Infrastructure for Freehand Manipulation on Interactive Surfaces", Retrieved From: https://resenv.media.mit.edu/classarchive/MAS965/readings/SmartSkin.pdf, Apr. 20, 2002, 8 Pages.

"Notice of Allowance Issued in U.S. Appl. No. 15/426,108", dated Apr. 12, 2019, 13 Pages.

"Tangible Atoms", https://web.archive.org/web/20150928195405/https:/vimeo.com/110182860, Retrieved on: Nov. 3, 2016, 2 pages.

"Objectviz", https://web.archive.org/web/20150611034833/http://www.tangibledisplay.com/en/objectviz, Published on: Jun. 11, 2015, 3 pages.

Voelker, et al., "PUCs Demo: Detecting Transparent, Passive Untouched Capacitive Widgets on Unmodified Multi-touch Displays", In Proceedings of ACM Symposium on User Interface Software and Technology, Oct. 8, 2013, 2 pages.

Yu, et al., "TUIC: Enabling Tangible Interaction on Capacitive Multi-touch Display", In Proceedings of SIGCHI Conference on Human Factors in Computing Systems, May 7, 2011, 10 pages.

"Tangible Display", http://www.tangibledisplay.com/en/objectviz/, Retrieved on: Nov. 3, 2016, 14 pages.

Humphries, Matthew, "iPad & iPhone tactile object recognition system bodes well for board games", http://www.geek.com/apple/ipad-iphone-tactile-object-recognition-system-bodes-well-for-board-games-1280216/, Published on: Aug. 27, 2010, 5 pages.

"40 SUR40 SMART Signage", http://www.samsung.com/uk/business/business-products/smart-signage/professional-display/LH40SFWTGC/EN, Retrieved on: Nov. 3, 2016, 10 pages.

"Samsung SUR40 with Microsoft PixelSense", https://www.youtube.com/watch?v=kmOku92MIQc, Published on: Jun. 18, 2012, 1 pages.

Scoble, Robert, "Cool use of Microsoft Surface table at Gnomedex", https://www.youtube.com/watch?v=rkSgRGHU9YI, Published on: Aug. 26, 2009, 1 pages.

Berkebile, Bob, "Physical object to mobile touch screen interaction", https://www.youtube.com/watch?v=Mxz3iSLqSLM, Published on: Dec. 23, 2011, 1 pages.

"Tiggly: makers of interactive toys and iPad learning apps", https://www.tiggly.com/, Retrieved on: Nov. 7, 2016, 7 pages.

Schaper, Hauke, "Physical Widgets on Capacitive Touch Displays", In Master's Thesis at the Media Computing Group, RWTH Aachen University, Apr. 2013, 118 pages.

Weiss, et al., "SLAP widgets: bridging the gap between virtual and physical controls on tabletops", In Proceedings of SIGCHI Conference on Human Factors in Computing Systems, Apr. 6, 2009, pp. 481-490.

Chan, et al., "CapStones and ZebraWidgets: sensing stacks of building blocks, dials and sliders on capacitive touch screens", In Proceedings of SIGCHI Conference on Human Factors in Computing Systems, May 5, 2012, pp. 2189-2192.

Izadi, et al., "C-Slate: A Multi-Touch and Object Recognition System for Remote Collaboration using Horizontal Surfaces", In Proceedings of Second Annual IEEE International Workshop on Horizontal Interactive Human-Computer System, Oct. 10, 2007, pp. 3-10.

* cited by examiner

200

300

DETECTING INPUT BASED ON A CAPACITIVE PATTERN

CROSS-REFERENCE TO RELATED APPLICATIONS

This application claims the benefit of U.S. Provisional Patent Application Ser. No. 62/412,613, filed on Oct. 25, 2016, titled "Detecting Input Based on a Capacitive Pattern," the contents of which are incorporated herein in their entirety by reference.

BACKGROUND

Computing devices can accept many forms of input from various input devices such as touchscreen displays, keyboards, and mice, among others. In some examples, the computing devices are configured to communicate with input devices. For example, computing devices may store applications or driver files that enable the computing device to communicate with an input device. In some examples, the driver files can indicate to the computing device how to communicate with the input devices.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment described herein includes a system for detecting input, wherein the system includes memory and at least one processor to detect a capacitive pattern from a physical object and detect that the physical object is a passive physical object. The processor can also determine a plurality of characteristics corresponding to the passive physical object based on the capacitive pattern, wherein the plurality of characteristics comprise a type of the physical object and a capability of the physical object. Furthermore, the processor can modify an application manager to detect input from the passive physical object based on the plurality of characteristics and modify a user interface setting detected from the capacitive pattern.

In another embodiment described herein, a method for detecting input can include detecting a capacitive pattern from a physical object and detecting that the physical object is a passive physical object. The method can also include determining a plurality of characteristics corresponding to the passive physical object based on the capacitive pattern, wherein the plurality of characteristics comprise a type of the physical object and a capability of the physical object. Furthermore, the method can include modifying an application manager to detect input from the passive physical object based on the plurality of characteristics and modifying a user interface setting detected from the capacitive pattern.

In yet another embodiment described herein, one or more computer-readable storage devices for detecting input can include a plurality of instructions that, based at least on execution by a processor, cause the processor to detect a capacitive pattern from a physical object and detect that the physical object is a passive physical object. The plurality of instructions can also cause the processor to determine a plurality of characteristics corresponding to the passive physical object based on the capacitive pattern, wherein the plurality of characteristics comprise a type of the physical object and a capability of the physical object. Furthermore, the plurality of instructions can cause the processor to modify an application manager to detect input from the passive physical object based on the plurality of characteristics and modify a user interface setting detected from the capacitive pattern.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
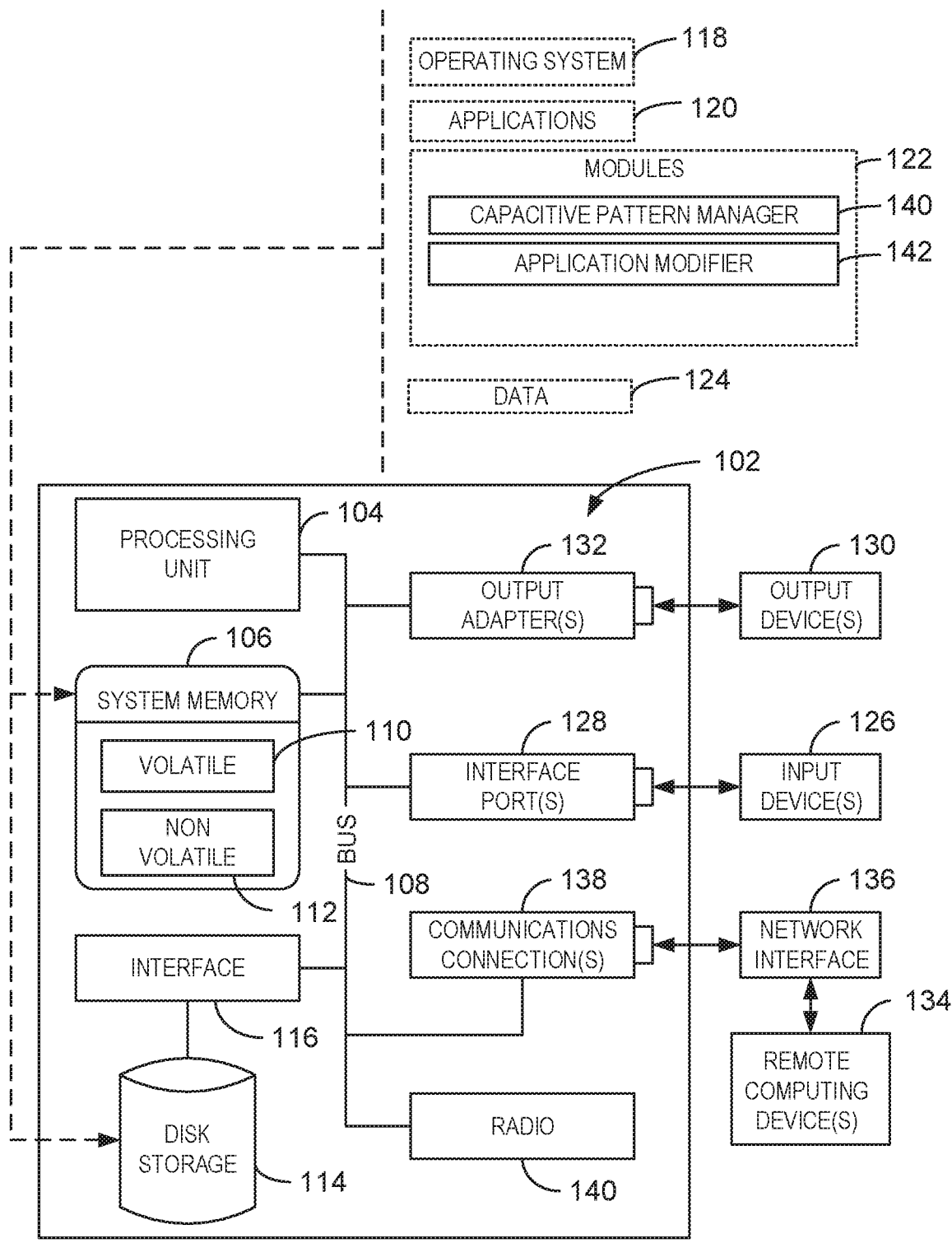
FIG. 1 is a block diagram of an example of a computing system that can detect input based on a capacitive pattern.

Techniques described herein enable a computing device to detect input from a physical object based on a capacitive pattern. In some examples, the capacitive pattern can be static or dynamic, wherein a dynamic capacitive pattern can change over time. A physical object, as referred to herein, can include any suitable active or passive device that can provide input to a computing device. An active physical object can include any physical object with a power source and may additionally include a separate communication channel. For example, an active physical object may transmit data through the separate communication channel using any suitable short range wireless protocol, among others. In some embodiments, a passive physical object may not include a power source and can use conductive material to provide a capacitive signal to a computing device. Some embodiments described herein correspond to passive physical objects, which are unpowered devices. A capacitive pattern, as referred to herein, can include any suitable geometric pattern attached to a physical object. The capacitive pattern can enable a computing device to detect characteristics corresponding to the physical object.

In embodiments described herein, a system can detect a capacitive pattern from a physical object. For example, a touch screen display can detect a capacitive pattern based on regions of contact between the capacitive pattern and the touch screen display. The system can also determine a plurality of characteristics corresponding to the physical object based on the capacitive pattern. For example, a system can determine a size, type, and capability of a physical object. Furthermore, the system can modify an application to detect input from the physical object based on the plurality of characteristics. For example, a user interface of an application can be modified based on the physical object to include additional menus, value indicators, and the like.

In some embodiments, techniques described herein can enable physical objects to transmit data to a computing device without including additional electronic components in the physical objects. The techniques described herein also enable a computing device to dynamically detect data from a physical object based on a position or orientation of the physical object with respect to a computing device. Techniques described herein also enable the use of geometric patterns to identify physical object classes, such as dials or buttons, among others, and their input capabilities. In some embodiments, the input capabilities of a physical object can include the physical object's ability to change shape, the presence of buttons, the presence of other movable components, such as sliders, and the ability of the physical object to rotate, among others. Additionally, the techniques described herein enable the use of physical objects for mechanical input to control a computing system.

Furthermore, the techniques enable combining use of the physical objects with multi-touch input or active input devices. Moreover, the techniques described herein enable a system to detect physical objects that can change size and/or shape as recognized by spatial distortions of the identifying capacitive pattern. Additionally, the techniques described herein enable a system to detect a capacitive pattern that encodes a description of and enables recognition of a physical object's presence, position, orientation, object class, state (e.g. position of a slider), and capabilities (e.g. supported physical interactions). In some embodiments, the techniques described herein can also enable a system to detect additional input from active physical objects that combine capacitive recognition of a device location, device class, and orientation, among others, with other interactions communicated over a wired or wireless protocol such as wireless protocols that use short-wavelength, ultra-high frequency (UHF) radio waves, radio frequency digitizers, and the like. For example, a physical object may include integrated buttons or touch gesture surface that accept input and transmit the input to a system via any suitable protocol to exchange information over short distances.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can detect input based on a capacitive pattern. The example system 100 includes a computing device 102.

The computing device 102 includes a processing unit 104, a system memory 106, and a system bus 108. In some examples, the computing device 102 can be a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

The basic input/output system (BIOS), containing the basic routines to transfer information between elements within the computing device 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computing device 102 also includes other computer-readable media, such as removable/non-removable, volatile/non-volatile computer storage media. FIG. 1 shows, for example a disk storage 114. Disk storage 114 includes, but is not limited to, devices like a magnetic disk drive, floppy disk drive, tape drive, Jaz drive, Zip drive, LS-drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computing device 102.

System applications 120 take advantage of the management of resources by operating system 118 through program modules 122 and program data 124 stored either in system memory 106 or on disk storage 114. It is to be appreciated that the disclosed subject matter can be implemented with various operating systems or combinations of operating systems.

A user enters commands or information into the computing device 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some embodiments, the input devices 126 can include active physical objects or passive physical objects. As discussed above, an active physical object can include any physical object with a power source and may additionally include a separate communication channel. For example, an active physical object may transmit data through the separate communication channel using any suitable short range wireless protocol, among others. In some embodiments, a passive physical object may not include a power source and can use conductive material to provide a capacitive signal to a computing device. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computing device 102 and to output information from computing device 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computing device 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computing device 102.

Remote computing devices 134 can be logically connected to the computing device 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computing device 102, it can also be external to the computing device 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

The computing device 102 can further include a radio 140. For example, the radio 140 can be a wireless local area network radio that may operate one or more wireless bands. For example, the radio 140 can operate on the industrial, scientific, and medical (ISM) radio band at 2.4 GHz or 5 GHz. In some examples, the radio 140 can operate on any suitable radio band at any radio frequency.

The computing device 102 includes one or more modules 122, such as a capacitive pattern manager 142, and an application modifier 144. In some embodiments, the capacitive pattern manager 142 can detect a capacitive pattern from a physical object, detect that the physical object is a passive physical object, and determine a plurality of characteristics corresponding to the physical object based on the capacitive pattern. In some embodiments, the application modifier 144 can modify an application to detect input from the physical object based on the plurality of characteristics and modify a user interface setting detected from the capacitive pattern. The capacitive pattern manager 142 and the application modifier 144 are described in greater detail below in relation to FIGS. 2 and 3.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). Furthermore, any of the functionalities of the capacitive pattern manager 142, and the application modifier 144 may be partially, or entirely, implemented in hardware and/or in the processor 104. For example, the functionality may be implemented with an application specific integrated circuit, in logic implemented in the processor 104, or in any other device.

Figure 2:
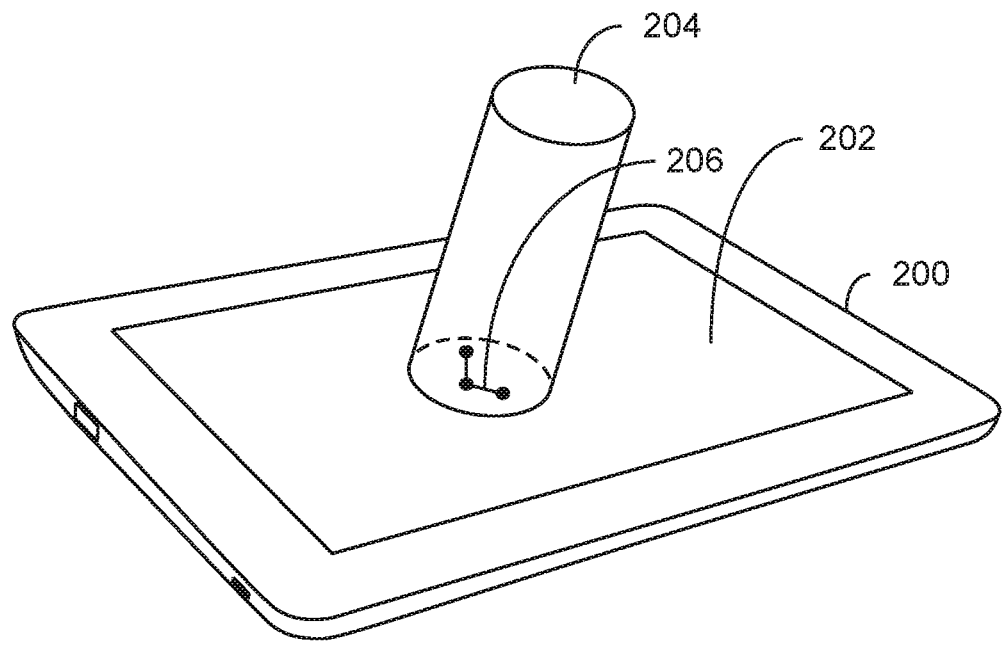
FIG. 2 is a diagram illustrating an example system comprising a computing device and an input device with a capacitive pattern.

FIG. 2 is a diagram illustrating a system that includes a touch screen display and a physical object with a capacitive pattern. The system 200 may include the capacitive pattern manager 142 and an application modifier 144 of computing system 102 of FIG. 1.

In some embodiments, the system 200 can include a touch screen display 202 that can detect any input using resistive or capacitive capabilities. In some embodiments, the touch screen display 202 can detect input from a stylus, a finger, or a physical object 204. As discussed above, a physical object can be an active device or a passive device. In some examples, an active physical object can include a power source and can transmit data to the system 200 using any suitable wired or wireless protocol. A passive physical object may not include a power source and can provide input to the system 200 by contacting the touch screen display 202. A passive physical object can include any suitable rigid object, plastic object, multiple connected objects, objects that are both rigid and malleable, and the like. The physical object 204 may be any suitable shape and may include various capabilities. The physical objects are described in greater detail below in relation to FIG. 3.

In some embodiments, the physical object 204 can include a capacitive pattern 206 attached to a surface of the physical object 204. In some embodiments, the capacitive pattern 206 is raised above the surface of the physical object 204. In some examples, the capacitive pattern 206 is placed on the bottom of a physical object 204 to enable detection of the capacitive pattern 206 with a touch screen display 202. In some examples, the capacitive pattern can be generated artificially from an object or from user contact with the touch screen display 202. The capacitive pattern 206, when placed in contact with the touch screen display 202, can provide information to the system 200 such as characteristics of the physical object 204. The characteristics can include a type of the physical object, a size of the physical object, a class of the physical object, a user interface setting, and the like. For example, the characteristics can indicate if a physical object 204 is a slider object, a dial object, a fixed object, and the like. In some examples, the capacitive pattern 206 can include any suitable number of geometric figures such as circles, squares, or rectangles, among others. The geometric figures of the capacitive pattern 206 can be interconnected, such as with lines, or the geometric figures may not be interconnected. In some embodiments, the capacitive pattern 206 can include different textures for each geometric figure, wherein the textures in combination with the pattern of the geometric figures, indicate characteristics of the physical object 204. In some embodiments, each capacitive pattern can include any number of different geometric figures to indicate the characteristics of the physical object 204.

In some embodiments, a user interface provided by the touch screen display 202 can be modified based on the physical object 204. For example, the user interface can provide additional menus corresponding to the physical object 204, modify existing menus based on the physical object 204, reconfigure elements displayed in the user interface, and the like. In some examples, the user interface may provide an input scale or values corresponding to a physical object that belongs to a dial or slider class. The user interface can enable a user to view feedback on the touch screen display 202 as the physical object is rotated or moved along a sliding path.

It is to be understood that the block diagram of FIG. 2 is not intended to indicate that the system 200 is to include the components shown in FIG. 2. Rather, system 200 can include additional physical objects and capacitive patterns not illustrated in FIG. 2.

Figure 3:
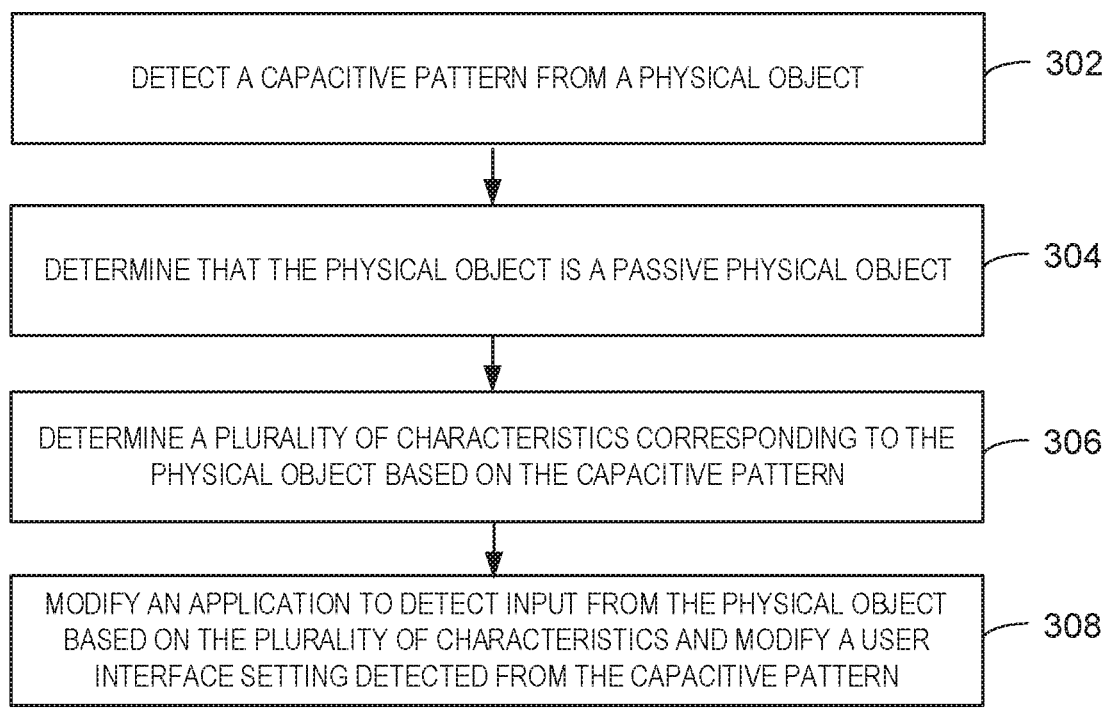
FIG. 3 is a process flow diagram of an example method for detecting input based on a capacitive pattern.

FIG. 3 is a process flow diagram illustrating a method for detecting input from a physical object based on a capacitive pattern. The method 300 can be implemented with any suitable computing device, such as the computing device 102 of FIG. 1.

At block 302, a capacitive pattern manager 142 can detect a capacitive pattern from a physical object. In some embodiments, the capacitive pattern manager 142 can detect the capacitive pattern via a touch screen display. For example, the capacitive pattern manager 142 can detect any suitable number of contact regions between the capacitive pattern and the touch screen display. In some examples, the capacitive pattern can include an asymmetrical pattern to enable detecting an orientation of the physical object. For example, an asymmetrical capacitive pattern can enable an application to determine a starting orientation for a dial physical object, or a slider physical object, among others. In some embodiments, the capacitive pattern manager 142 can detect a physical object that can stretch in three dimensions and use a capacitive pattern or digitizer to detect changes in an X or Y dimension, while detecting changes in a Z dimension, or an up or down direction, based on a depth camera. In some examples, changes in all three dimensions or directions can be mapped to different system inputs once correlated. In some examples, a camera can detect a pattern that is similar to the capacitive pattern using similar geometry but provided through visible contrast, or change in IR reflectivity visible to an IR or depth camera, among others. Combining data from a camera with a capacitive pattern can support richer interactions, such as 3D manipulations, and enable error checking of physical object detection by comparing both signals. In some embodiments, a capacitive pattern can be included on any sticker or thin adhesive surface that can be attached to any suitable object with capabilities that match the capacitive pattern. In some examples, the sticker or thin adhesive surface can be attached to a plurality of different physical objects in order to cause the system to interpret the different physical objects as the same object type.

At block 304, the capacitive pattern manager 142 can detect that the physical object is a passive physical object. For example, the capacitive pattern may indicate capabilities of a physical object such as whether a physical object is passive or active, if the physical object includes buttons or touch input surfaces, and the like. A passive physical object can include a dial, a slider, a keypad, a ruler, or a magnifying glass, among others. The passive physical object may not include additional circuits or a power source. Rather, the passive physical object can be any suitable material that provides input to a system based on contact with a touch screen display. The passive physical object can provide the input using any suitable capacitive or resistive signal based on contact with a touch screen display. In some embodiments, an active physical object can include a touch input surface and transmit data to the system using any suitable wired or wireless protocol.

At block 306, the capacitive pattern manager 142 can determine a plurality of characteristics corresponding to the physical object based on the capacitive pattern. In some embodiments, the capacitive pattern can indicate characteristics such as a position, orientation, object class, state, capabilities, manufacturer of the physical object, and a user interface setting, among others. For example, a state of a physical object may include a position of a slider or a dial. A capability of a physical object can include a supported physical interaction of the physical device such as whether the physical device can be rotated, stretched, or detect touch input, among others.

In some examples, the type of the physical object comprises a slider object, a dial object, a mechanical object, a moveable object, an object with interior moving parts, or a fixed object, among others. In some examples, the capacitive pattern manager 142 can detect an object class corresponding to the physical object based on the capacitive pattern. The object class, as referred to herein, can indicate a set of libraries to be loaded by the capacitive pattern manager 142 to enable a computing device to interact with a physical object. In some examples, the capacitive pattern manager 142 can detect a capability of the physical object to change size based on the spatial relations of the capacitive pattern. For example, a physical object may stretch or shrink or be otherwise manipulated as input is provided to a system.

In some embodiments, the capacitive pattern manager 142 can detect that the physical object is an active device or a passive device based on the capacitive pattern. As discussed above, a passive physical object may include any material that can provide input to a device without using power or an electronic transmission of data. For example, a passive physical object can be any suitable material, such as plastic, that can provide input to a system based on changing the contact points between the passive physical object and a touch screen of a system. In some embodiments, passive physical objects can emit a signal detected by a touch screen display or sensor via conductivity, or any other suitable technique. An active physical object can include any physical object with a power source that can transmit data to a system using a wired or wireless protocol. In some embodiments, the capacitive pattern manager 142 can detect the location of the physical object from a contact point between the physical object and a display device, and detect the size of the physical object and the type of the physical object from the capacitive pattern.

In some examples, the capacitive pattern manager 142 can detect a user interface setting based on the capacitive pattern. For example, the user interface setting can indicate a location to display a menu proximate the physical object, a size of the menu, a type of the menu, and the like. In some embodiments, the menu can include radio buttons, a command bar, or a cascading menu, among others. The user interface setting can also correspond to a three dimensional object. For example, the user interface setting can indicate a location and size in three dimensional space to render a three dimensional object, such as a menu, proximate a physical object. In some embodiments, the three dimensional object can be viewed using any suitable augmented reality device.

At block 308, an application manager 144 can modify an application, the application manager 144 itself, or an operating system to detect input from the physical object based on the plurality of characteristics. In some embodiments, the application manager 144 can modify the application to provide a menu proximate a location of the physical object. In some embodiments, the application manager 144 can modify a user interface based on a location, a size, an orientation, and a type of the physical object. For example, the application manager 144 can reconfigure a user interface based on the location, size, and type of a physical object. The application manager 144 can also modify or reconfigure the user interface based on a user interface setting detected from the capacitive pattern. In some examples, the application manager 144 can provide ranges of values in a user interface of an application proximate the physical object based on the type of the physical object. For example, the application manager 144 can modify an application to display measurement values proximate a ruler physical object or volume values proximate a dial physical object corresponding to sound controls, among others.

In some examples, the application manager 144 can perform configuration operations prior to detecting a physical object. For example, the application manager 144 can specify from which physical object the application manager 144 would like to detect input. In some examples, the application manager 144 can instantiate a physical object manager, enable specific physical objects, and distinguish between physical objects of the same type. In some examples, if a physical object is registered and known to a system, the application manager 144 can declare that the application manager 144 or an application is interested in detecting input from the physical object. The application manager 144 can also detect a notification when a physical object is coupled to the device. In some examples, if a physical object is detected by a system, the application manager 144 can detect the characteristics of the physical object. In some embodiments, an application manager 144 can declare a physical object that can be either registered into a system or added via any suitable application based on an external registration or identification file. In some examples, the identification file can be any suitable markup language. In some embodiments, the identification file can indicate an identifier, type, and capabilities of a supported physical object. The identification file can also include a library of standard objects declared in a system and custom behavior of an existing class of objects. In some examples, a physical object can be previously registered in a system or declared locally in an application manager 144. In some embodiments, the identification file library can be stored locally, on a remote server, or in a specific application.

In some embodiments, the application manager 144 can identify an object type of a physical object and associate a specific physical object with its instance in an application. Additionally, this may not be confined to the view of the physical object from a particular device, but regardless of which device interacts with the physical object. In some examples, the physical object can include an active communication channel to emit a unique object tag and on-object memory or an instance in a remote server to correlate the unique object tag with characteristics of a physical object. For example, a game totem may store achievements earned. In some embodiments, the active communication channel can use any suitable radio frequency identification protocol, or near field communication protocol, among others. In some examples, the physical object can store related user settings such as a preferred handedness or directionality of a physical object, among others.

Still at block 308, in some embodiments, the application manager 144 can provide a notification of instantiation of a physical object. For example, the notification can indicate a registry of physical objects and a presence of a physical object such as if a physical object is connected to a device or if a physical object corresponds to a trigger. For example, the trigger can include a button press, a sensor value, and the like. In some embodiments if a physical object instantiates a software class object, the application manager 144 can determine if actions performed by the physical object map to capabilities supported by the physical object. For example, a dial physical object can provide a rotational action, and the application manager 144 can detect a range of values that correspond to the context of an application interacting with the dial physical object. In some embodiments, the application manager 144 can detect that a rotation action corresponds to an increased or decreased value.

In one embodiment, the process flow diagram of FIG. 3 is intended to indicate that the steps of the method 300 are to be executed in a particular order. Alternatively, in other embodiments, the steps of the method 300 can be executed in any suitable order and any suitable number of the steps of the method 300 can be included. Further, any number of additional steps may be included within the method 300, depending on the specific application. For example, the capacitive pattern manager 142 may detect a change to the capacitive pattern, wherein the change indicates an alteration of the shape of the physical object. In some embodiments, the capacitive pattern manager 142 can detect additional input from a separate input device and modify the input from the physical object based on the additional input. For example, the additional input may include information provided by a stylus, a keyboard selection or a button selection of a mouse, which can result in input from a physical object performing different actions for an application. In some examples, the keyboard selection can include any suitable modifier key such as a shift key, among others. In some embodiments, the application manager 144 can detect additional input such as a three dimensional gesture or an audible command. The three dimensional gesture or the audible command can be combined with input provided by the physical object.

In some embodiments, the application manager 144 can detect a location of the physical object from a contact point between the physical object and a display device and a type of the physical object from the capacitive pattern. The application manager 144 can also detect a size of the physical object based on the capacitive pattern combined with size information from a camera or any other suitable sensor. In some embodiments, the application manager 144 can detect a class of physical objects based on a capacitive pattern as opposed to a single physical object. In some examples, the application manager 144 can also detect variable data based on the position or orientation of a detected physical object.

Figure 4:
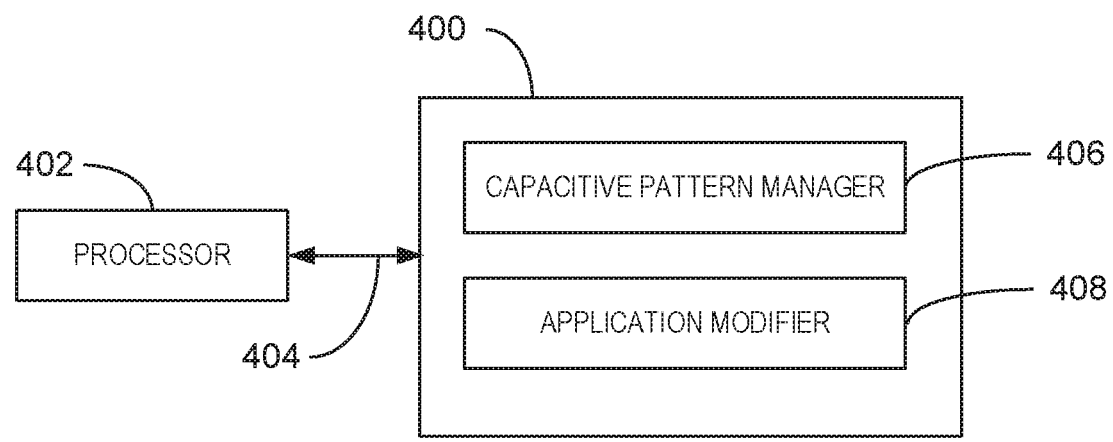
FIG. 4 is a block diagram of an example computer-readable storage media that can detect input based on a capacitive pattern.

FIG. 4 is a block diagram of an example computer-readable storage media that can detect input from a physical object based on a capacitive pattern. The tangible, computer-readable storage media 400 may be accessed by a processor 402 over a computer bus 404. Furthermore, the tangible, computer-readable storage media 400 may include code to direct the processor 402 to perform the steps of the current method.

The various software components discussed herein may be stored on the tangible, computer-readable storage media 400, as indicated in FIG. 4. For example, the tangible computer-readable storage media 400 can include a capacitive pattern manager 406, and an application modifier 408. In some embodiments, the capacitive pattern manager 406 can detect a capacitive pattern from a physical object and detect that the physical object is a passive physical object. The capacitive pattern manager 406 can also determine a plurality of characteristics corresponding to the physical object based on the capacitive pattern. For example, the plurality of characteristics can include a type of the physical object and a capability of the physical object. In some embodiments, the application modifier 408 can modify an application to detect input from the physical object based on the plurality of characteristics and modify a user interface setting detected from the capacitive pattern.

It is to be understood that any number of additional software components not shown in FIG. 4 may be included within the tangible, computer-readable storage media 400, depending on the specific application.

Figure 5:
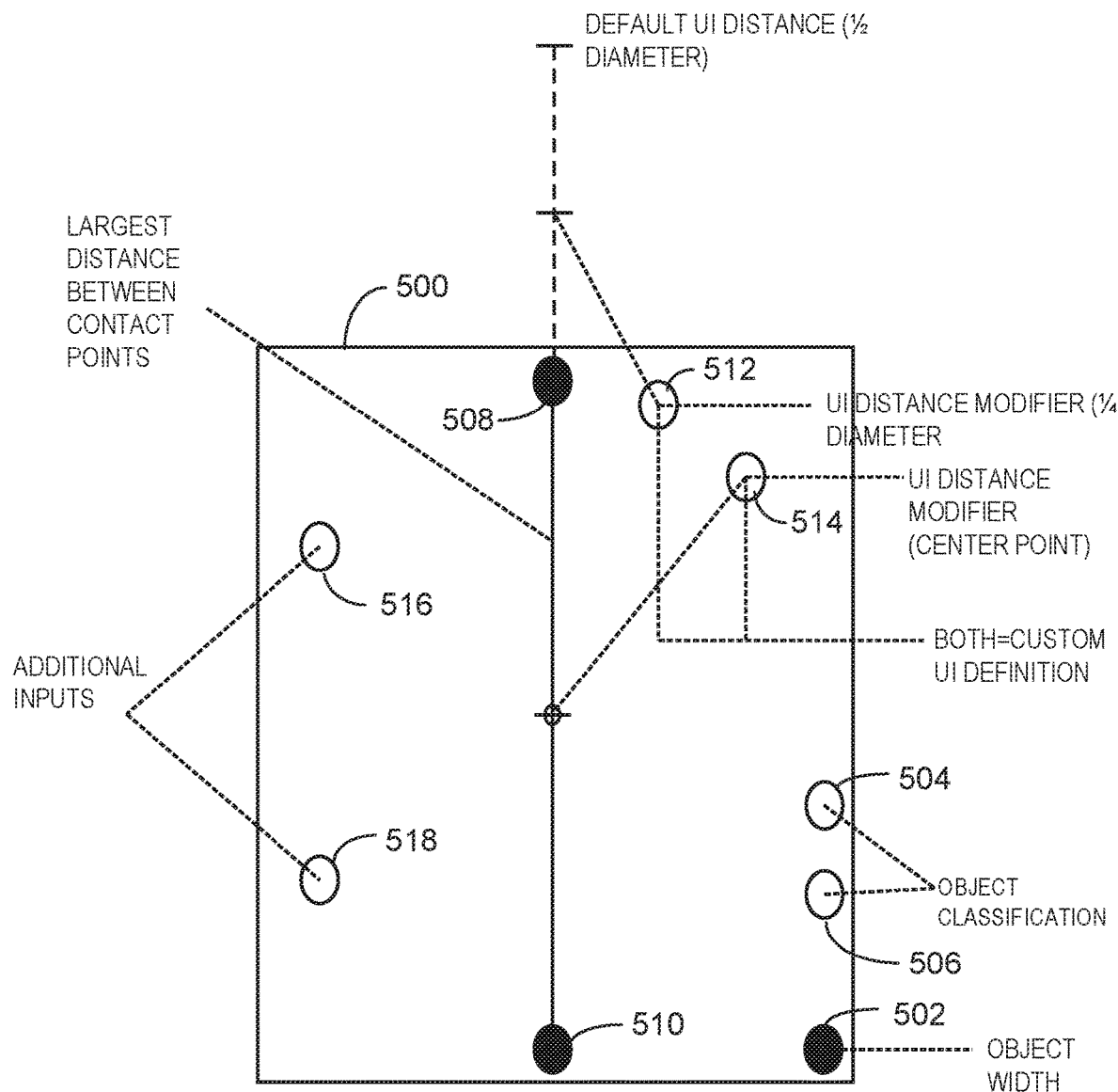
FIG. 5 is a diagram illustrating an example capacitive pattern.

FIG. 5 is a diagram illustrating an example capacitive pattern. The capacitive pattern 500 can be attached to any suitable physical object and the capacitive pattern 500 can be detected with any suitable computing device such as the computing device 102 of FIG. 1.

In some embodiments, the capacitive pattern 500 can include any number of contact points that indicate various characteristics of a physical object. For example, the capacitive pattern 500 can include a contact point 502 corresponding to a width of a physical object, contact points 504 and 506 corresponding to an object type of the physical object, contact points 508 and 510 corresponding to a maximum distance between contact points, contact point 512 corresponding to a user interface distance modifier, and contact point 514 corresponding to a center point of a user interface modifier. The capacitive pattern 500 can also include contact points 516 and 518 corresponding to additional inputs that can include any information regarding the physical object. In some examples, the capacitive pattern 500 can include any number of additional contact points or any number of fewer contact points.

In some embodiments, identifying the contact points of a capacitive pattern 500 with the furthest distance (contact points 508 and 510) can allow a frame of reference for other contact points. For example, the capacitive pattern manager 142 can first identify the contact points with the furthest distance (contact points 508 and 510) and then search for a proximate contact point at a specific location such as contact point 502. In some examples, contact points 512 and 514 enable an object to provide information to an operating system regarding where an associated user interface is to be placed or displayed. For example, the user interface associated with an object can be displayed either further or closer to the outer edge of an object based on contact point 512. The user interface can also be displayed inside the bounds of an object based on contact point 514. This enables objects to have physical characteristics that may not be easily quantifiable by the contact points themselves. For example, an object may be a radio knob which is circular with a protruding pointer. If the user interface for such an object is associated with the diameter of the circular area of the object, the protruding pointer that indicates a direction may obscure the user interface. Therefore, contact points 512 and 514 can enable an object to indicate, via a capacitive pattern, that a user interface is to be displayed further away from the edge of the object. This can allow for the user interface to not be obscured by the protruding pointer if an object is a radio knob or a similar object. In some examples, if the object is a digital magnifying glass, where the focus area and user interface should be within the circular bounds of the object, then contact point 514 can provide this information to an operating system. In this example, the object can be partially or fully transparent at the center to enable viewing of the user interface.

Example 1

In one example, a system for detecting input includes memory and a processor configured to detect a capacitive pattern from a physical object and detect that the physical object is a passive physical object. The processor can also determine a plurality of characteristics corresponding to the passive physical object based on the capacitive pattern, wherein the plurality of characteristics comprise a type of the physical object and a capability of the physical object. Furthermore, the processor can modify an application manager to detect input from the passive physical object based on the plurality of characteristics and modify a user interface setting detected from the capacitive pattern.

In some embodiments, the processor can detect the capacitive pattern via a touch screen display. Alternatively, or in addition, the capacitive pattern can include an asymmetrical pattern and wherein the processor is to detect an orientation of the physical object based on the asymmetrical pattern. Alternatively, or in addition, the capacitive pattern indicates a location in three dimensional space to render a three dimensional object in relation to the physical object. Alternatively, or in addition, the type of the physical object can include a slider object, a dial object, or a mechanical object with a button. Alternatively, or in addition, the processor can modify the application manager to provide a menu proximate a location of the physical object based on the user interface setting detected from the capacitive pattern. Alternatively, or in addition, the processor can detect a change to the capacitive pattern, the change indicating an alteration to a shape of the physical object. Alternatively, or in addition, the processor can detect a location of the physical object from a contact point between the physical object and a display device, and wherein the processor is to detect a type of the physical object from the capacitive pattern, and detect a size of the physical object based on the capacitive pattern combined with size information from a camera. Alternatively, or in addition, the processor can detect an object class corresponding to the physical object based on the capacitive pattern. Alternatively, or in addition, the physical object can include a touch input surface. Alternatively, or in addition, the processor can display a measurement value proximate the physical object, wherein the physical object corresponds to a ruler. Alternatively, or in addition, the processor can detect that the physical object is an active device or a passive device based on the capacitive pattern. Alternatively, or in addition, the processor can detect additional input from a separate input device and modify the input from the physical object based on the additional input. Alternatively, or in addition, the separate input device can be a stylus, a keyboard or a mouse. Alternatively, or in addition, the additional input can include a three dimensional gesture or an audible command.

Example 2

In another embodiment described herein, a method for detecting input can include detecting a capacitive pattern from a physical object and detecting that the physical object is a passive physical object. The method can also include determining a plurality of characteristics corresponding to the passive physical object based on the capacitive pattern, wherein the plurality of characteristics comprise a type of the physical object and a capability of the physical object. Furthermore, the method can include modifying an application manager to detect input from the passive physical object based on the plurality of characteristics and modifying a user interface setting detected from the capacitive pattern.

In some embodiments, the method can include detecting the capacitive pattern via a touch screen display. Alternatively, or in addition, the capacitive pattern can include an asymmetrical pattern and the method can include detecting an orientation of the physical object based on the asymmetrical pattern. Alternatively, or in addition, the capacitive pattern indicates a location and size in three dimensional space to render a three dimensional object in relation to the physical object. Alternatively, or in addition, the type of the physical object can include a slider object, a dial object, or a mechanical object with a button. Alternatively, or in addition, the method can include modifying the application manager to provide a menu proximate a location of the physical object based on the user interface setting detected from the capacitive pattern. Alternatively, or in addition, the method can include detecting a change to the capacitive pattern, the change indicating an alteration to a shape of the physical object. Alternatively, or in addition, the method can include detecting a location of the physical object from a contact point between the physical object and a display device, and detecting a type of the physical object from the capacitive pattern, and detecting a size of the physical object based on the capacitive pattern combined with size information from a camera. Alternatively, or in addition, the method can include detecting an object class corresponding to the physical object based on the capacitive pattern. Alternatively, or in addition, the physical object can include a touch input surface. Alternatively, or in addition, the method can include displaying a measurement value proximate the physical object, wherein the physical object corresponds to a ruler. Alternatively, or in addition, the method can include detecting that the physical object is an active device or a passive device based on the capacitive pattern. Alternatively, or in addition, the method can include detecting additional input from a separate input device and modifying the input from the physical object based on the additional input. Alternatively, or in addition, the separate input device can be a stylus, a keyboard or a mouse. Alternatively, or in addition, the additional input can include a three dimensional gesture or an audible command.

Example 3

In yet another embodiment described herein, one or more computer-readable storage devices for detecting input can include a plurality of instructions that, based at least on execution by a processor, cause the processor to detect a capacitive pattern from a physical object and detect that the physical object is a passive physical object. The plurality of instructions can also cause the processor to determine a plurality of characteristics corresponding to the passive physical object based on the capacitive pattern, wherein the plurality of characteristics comprise a type of the physical object and a capability of the physical object and modify an application manager to detect input from the passive physical object based on the plurality of characteristics and modify a user interface setting detected from the capacitive pattern.

In some embodiments, the plurality of instructions can cause the processor to detect the capacitive pattern via a touch screen display. Alternatively, or in addition, the capacitive pattern can include an asymmetrical pattern and wherein the processor is to detect an orientation of the physical object based on the asymmetrical pattern. Alternatively, or in addition, the capacitive pattern indicates a location in three dimensional space to render a three dimensional object in relation to the physical object. Alternatively, or in addition, the type of the physical object can include a slider object, a dial object, or a mechanical object with a button. Alternatively, or in addition, the plurality of instructions can cause the processor to modify the application manager to provide a menu proximate a location of the physical object based on the user interface setting detected from the capacitive pattern. Alternatively, or in addition, the plurality of instructions can cause the processor to detect a change to the capacitive pattern, the change indicating an alteration to a shape of the physical object. Alternatively, or in addition, the plurality of instructions can cause the processor to detect a location of the physical object from a contact point between the physical object and a display device, and wherein the plurality of instructions can cause the processor to detect a type of the physical object from the capacitive pattern, and detect a size of the physical object based on the capacitive pattern combined with size information from a camera. Alternatively, or in addition, the plurality of instructions can cause the processor to detect an object class corresponding to the physical object based on the capacitive pattern. Alternatively, or in addition, the physical object can include a touch input surface. Alternatively, or in addition, the plurality of instructions can cause the processor to display a measurement value proximate the physical object, wherein the physical object corresponds to a ruler. Alternatively, or in addition, the plurality of instructions can cause the processor to detect that the physical object is an active device or a passive device based on the capacitive pattern. Alternatively, or in addition, the plurality of instructions can cause the processor to detect additional input from a separate input device and modify the input from the physical object based on the additional input. Alternatively, or in addition, the plurality of instructions can cause the processor to modify a user interface based on a location, a size, an orientation, and a type of the physical object. Alternatively, or in addition, the separate input device can be a stylus, a keyboard or a mouse. Alternatively, or in addition, the additional input can include a three dimensional gesture or an audible command.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for detecting input, the system, comprising:
   memory; and
   a processor to:
   detect a capacitive pattern from a physical object, wherein the capacitive pattern comprises an asymmetrical pattern of contact points and wherein the processor is to detect an orientation of the physical object from the asymmetrical pattern of contact points, wherein the capacitive pattern comprises a user interface distance modifier that indicates a distance to display a user interface from an edge of the physical object;
   detect that the physical object is a passive physical object;
   determine a plurality of characteristics corresponding to the passive physical object, wherein the plurality of characteristics comprise a type of the physical object and a capability of the physical object; and
   modify an application manager to detect an input from movement of the asymmetrical pattern of contact points of the passive physical object and modify a user interface setting identified by the capacitive pattern.

2. The system of claim 1, wherein the processor is to detect the capacitive pattern via a touch screen.

3. The system of claim 1, wherein the capacitive pattern indicates a location in three dimensional space to render a three dimensional object in relation to the physical object.

4. The system of claim 1, wherein the type of the physical object comprises a slider object, a dial object, or a mechanical object with a button.

5. The system of claim 1, wherein the processor is to modify the application manager to provide a menu proximate a location of the physical object using the user interface setting identified by the capacitive pattern.

6. The system of claim 1, wherein the processor is to detect a change to the capacitive pattern, the change indicating an alteration to a shape of the physical object.

7. The system of claim 1, wherein the processor is to detect a location of the physical object from a contact point between the physical object and a display device, and wherein the processor is to detect the type of the physical object from the capacitive pattern, and detect a size of the physical object using the capacitive pattern combined with size information from a camera.

8. The system of claim 1, wherein the processor is to detect an object class corresponding to the physical object from the capacitive pattern.

9. The system of claim 1, wherein the physical object comprises a touch input surface.

10. The system of claim 1, wherein the processor is to display a measurement value proximate the physical object, wherein the physical object corresponds to a ruler.

11. The system of claim 1, wherein the processor is to detect that the physical object is an active device or a passive device from the capacitive pattern.

12. The system of claim 1, wherein the physical object is a separate input device comprising a stylus, a keyboard or a mouse.

13. The system of claim 1, wherein additional input comprises a three dimensional gesture or an audible command.

14. The system of claim 1, wherein the processor is to detect a state of the physical object from a position of a slider of the physical object.

15. The system of claim 1, wherein the capacitive pattern indicates a width of the physical object.

16. The system of claim 1, wherein the user interface distance modifier is to indicate a protruding pointer corresponding to the physical object.

17. A method for detecting input, comprising:
    detecting a capacitive pattern from a physical object, wherein the capacitive pattern comprises an asymmetrical pattern of contact points and wherein a processor is to detect an orientation of the physical object from the asymmetrical pattern of contact points wherein the capacitive pattern comprises a user interface distance modifier that indicates a distance to display a user interface from an edge of the physical object;
    detecting that the physical object is a passive physical object;
    determining a plurality of characteristics corresponding to the passive physical object, wherein the plurality of characteristics comprise a type of the physical object and a capability of the physical object; and
    modifying an application manager to detect an input from movement of the asymmetrical pattern of contact points of the passive physical object and modifying a user interface setting identified by the capacitive pattern.

18. The method of claim 17, wherein the capacitive pattern indicates a location and a size in three dimensional space to render a three dimensional object in relation to the physical object.

19. The method of claim 17 comprising detecting additional input from a separate input device and modify the input from the physical object using the additional input, wherein the additional input comprises a three dimensional gesture or an audible command.

20. One or more computer-readable storage devices for detecting input comprising a plurality of instructions that, based at least on execution by a processor, cause the processor to:
    detect a capacitive pattern from a physical object, wherein the capacitive pattern comprises an asymmetrical pattern of contact points and wherein the processor is to detect an orientation of the physical object from the asymmetrical pattern of contact points, wherein the capacitive pattern comprises a user interface distance modifier that indicates a distance to display a user interface from an edge of the physical object;
    detect that the physical object is a passive physical object;
    determine a plurality of characteristics corresponding to the passive physical object, wherein the plurality of characteristics comprise a type of the physical object and a capability of the physical object; and modify an application manager to detect an input from movement of the asymmetrical pattern of contact points of the passive physical object and modify a user interface setting identified by the capacitive pattern.

21. The one or more computer-readable storage devices of claim 20, wherein the capacitive pattern indicates a location in three dimensional space to render a three dimensional object in relation to the physical object.

22. The one or more computer-readable storage devices of claim 20, wherein plurality of instructions cause the processor to detect additional input from a separate input device and modify the input from the physical object using the additional input, wherein the additional input comprises a three dimensional gesture or an audible command.

* * * * *